A. Fitzpatrick,
Steam Pump.
N° 38,736. Patented June 2, 1863.
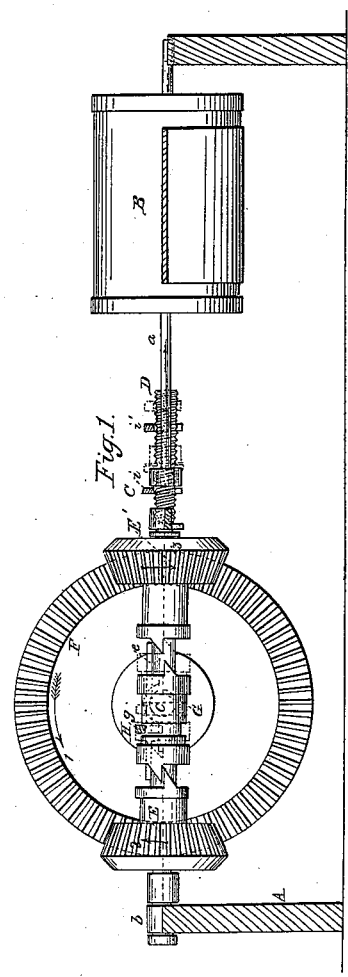
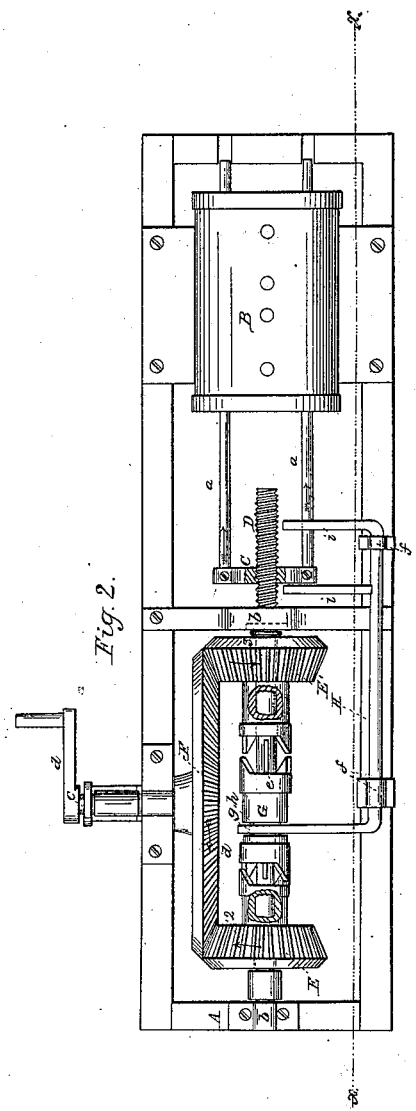
Witnesses.
Inventor:
Andrew Fitzpatrick

UNITED STATES PATENT OFFICE.

ANDREW FITZPATRICK, OF NEW YORK, N. Y.

IMPROVEMENT IN PUMPS.

Specification forming part of Letters Patent No. 38,736, dated June 2, 1863.

*To all whom it may concern:*

Be it known that I, ANDREW FITZPATRICK, of the city, county, and State of New York, have invented a new and Improved Pump; and I do hereby declare that the following is a full, clear, and exact description of the same, reference being had to the accompanying drawings, forming a part of this specification, in which—

Figure 1 represents a longitudinal vertical section of my invention, taken in the plane indicated by the line $x\,x$, Fig. 2. Fig. 2 is a plan or top view of the same.

Similar letters of reference in both views indicate corresponding parts.

This invention consists in the arrangement of a rotary screw-spindle, connected with and acting on the piston of the pump, in combination with a longitudinally-sliding clutch and reversible bevel-gear, in such a manner that, by the action of the reciprocating piston on suitable tappets the clutch is shifted and the bevel-gear reversed, and that by these means the screw-spindle is made to rotate alternately in one direction and then in the other, and the continuous rotary motion of the driving-wheel is converted into a rectilinear reciprocating motion of the piston.

To enable those skilled in the art to make and use my invention, I will proceed to describe its construction and operation with reference to the drawings.

A represents a frame, made of wood or any other suitable material which is capable of supporting the pump-cylinder B. The piston which works in this cylinder connects, by means of two rods, $a$, with a cross-head, C, and the rods $a$ are guided in both heads of the cylinder, so that the piston is not liable to bind if a reciprocating motion is imparted to the cross-head C.

D is a screw-spindle, which has its bearings in suitable journal-boxes, $b$, fastened to the frame A. The threaded end of this spindle screws into the cross-head C, so that by imparting to said spindle a rotary motion in one direction the piston is moved toward one end of the cylinder, and by reversing the motion of the spindle the piston moves in the opposite direction.

The screw-spindle bears two bevel-wheels, E E', which gear on opposite sides into a large bevel-wheel, F, which is secured to a shaft, $c$, and to which a rotary motion is imparted by a winch, $d$, or in any other suitable manner. The wheels E E' turn loosely on the spindle D; but they are confined on the same in such a manner that they cannot move in a longitudinal direction, and by rotating the wheel F in the direction of arrow 1 the wheel E rotates in the direction of arrow 2 and the wheel E' in the direction of arrow 3; and if the wheels E E' are so arranged that they can alternately be firmly connected to the screw-spindle the latter will assume a reciprocating rotary motion, thereby imparting to the piston the desired rectilinear reciprocating motion.

G is a clutch, which slides in a longitudinal direction on the spindle D, being prevented from rotating by a key, $e$, that is firmly inserted into said spindle. The toothed ends of said clutch are alternately thrown in gear with the corresponding teeth on the ends of the hubs of the wheels E E', and if the clutch is thrown in gear with the wheel E the piston moves in the direction of the arrows marked upon the piston-rods, and if the clutch is thrown in gear with the wheel E' the piston moves in the direction opposite to said arrows. The position of the clutch is changed by a rod, H, which slides in suitable eyes or boxes, $f$, on the frame A. The forked end $g$ of this rod catches into a neck or groove, $h$, turned into the body of the clutch, and it (the rod) is provided with two tappets, $i\,i'$, which extend beyond the edge of the cross-head C and on opposite sides of the same.

If the wheel F is rotated in the direction of arrow 1, and the clutch is brought in the position shown in the drawings, the piston moves in the direction of the arrows marked on the piston-rods until the cross-head strikes the tappet $i'$. When this takes place, the clutch is thrown in gear with the wheel E', the motion of the screw-spindle is reversed, and the piston moves in the opposite direction until the cross-head, by coming in contact with the tappet $i$, again reverses the motion of the spindle, and so forth. By these means the continuous rotary motion of the wheel F is converted into a reciprocating rectilinear motion of the piston, and the power which acts on the latter is quite considerable, so that my pump can be applied with particular advantage in such cases when it is desired to force water or other liquid to a considerable height or against a considerable pressure.

Having thus fully described my invention, what I claim as new, and desire to secure by Letters Patent, is—

Rotary screw-spindle D and cross-head C, connecting by rods $a$ with a piston moving in a pump-cylinder, B, in combination with the longitudinally-sliding clutch G, wheels E E' F, and tappet-rod H, all constructed and operating substantially as and for the purpose shown and described.

ANDREW FITZPATRICK.

Witnesses:
  JAMES LAIRD,
  TIMOTHY SHINE.